(12) United States Patent
Köhler (10) Patent No.: US 8,533,917 B2
(45) Date of Patent: Sep. 17, 2013

(54) ROPE CROSSING AND ROPE PLAY EQUIPMENT AND METHOD FOR PRODUCING A ROPE CROSSING AND APPARATUS FOR PERFORMING THE METHOD

(75) Inventor: Karl Heinz Köhler, Berlin (DE)

(73) Assignee: Berlinder Seifabrik GmbH & Co., Berlin (DE)

( * ) Notice: Subject to any disclaimer, the term of this patent is extended or adjusted under 35 U.S.C. 154(b) by 241 days.

(21) Appl. No.: 12/911,078

(22) Filed: Oct. 25, 2010

(65) Prior Publication Data

US 2012/0096684 A1    Apr. 26, 2012

(51) Int. Cl.
*F16G 11/00* (2006.01)
(52) U.S. Cl.
USPC .......................... 24/115 R; 289/1.5; 24/122.6
(58) Field of Classification Search
USPC ................. 24/122.6, 130, 129, 129 R, 129 A, 24/115 R; 289/1.5, 17, 18; 403/209, 212
See application file for complete search history.

(56) References Cited

U.S. PATENT DOCUMENTS

| | | | | |
|---|---|---|---|---|
| 686,232 A | | 11/1901 | Maher | |
| 1,460,333 A | * | 6/1923 | Aime | 403/209 |
| 3,310,623 A | * | 3/1967 | Vaughan | 206/702 |
| 3,631,570 A | * | 1/1972 | Coleman | 24/129 R |
| 3,961,011 A | | 6/1976 | Bramley | |
| 4,911,572 A | * | 3/1990 | Williams | 403/209 |
| 2010/0050397 A1 | | 3/2010 | Köhler | |

FOREIGN PATENT DOCUMENTS

| | | |
|---|---|---|
| EP | 0017837 A1 | 10/1980 |
| EP | 17837 A1 * | 10/1980 |
| GB | 618940 A | 3/1949 |
| WO | 2008031877 A1 | 3/2008 |

\* cited by examiner

*Primary Examiner* — Robert J Sandy
*Assistant Examiner* — Rowland D Do
(74) *Attorney, Agent, or Firm* — Norris McLaughlin & Marcus, P.A.

(57) ABSTRACT

A rope crossing secures rope lines on each other as well as rope play equipment which has at least one rope crossing. The rope crossing includes at least two crossing rope lines and a ring, wherein the ring has an inner opening with twice the number of essentially radially extending receiving regions in relation to the number of rope lines to be secured. A corresponding line segment of a rope line forming a bulge is received in two corresponding receiving regions that face one another, so that the bulges of crossing rope lines are arranged on respective opposite sides of the ring. The ratio of the unobstructed width LW of a receiving region to the diameter of the rope line D, which forms the bulge in this receiving region, is LW/D=0.8 to 0.98.

7 Claims, 13 Drawing Sheets

ROPE CROSSING AND ROPE PLAY EQUIPMENT AND METHOD FOR PRODUCING A ROPE CROSSING AND APPARATUS FOR PERFORMING THE METHOD

The present invention relates to a rope crossing for securing rope lines with respect to each other as well as rope play equipment which has at least one rope crossing according to the invention. The invention also relates to a method for producing a rope crossing according to the invention and an apparatus with which the method of the invention for producing the rope crossing can be performed.

In particular with so-called rope play equipment having a three-dimensional network of ropes, the position of the connection of crossing gropes needs to be maintained during the playing or climbing operation in order to ensure the safety of the climbing children and to maintain the shape of the three-dimensional rope network.

To this end, so-called cloverleaf rings are known through which two loops or bulges of ropes are guided such that they cross in the ring and the rope line segments abutting the bulges run on opposing sides of the ring. More particularly, the crossing point is here secured by the encompassing angle between the rope line segments at the crossing point realized with the ring. The greater the intended safety against unintentional movement of the crossing point is, the greater is the encompassing angle of conventional cloverleaf rings. In other words, relatively wide cloverleaf rings must be used to realize a safe crossing point or additional safety elements must be employed to positively and/or non-positively block an unintentional displacement of the cloverleaf ring.

It is an object of the invention to provide a rope crossing and a method and an apparatus for producing the rope crossing, which ensure a safe and reliable crosswise attachment of abutting rope lines with low material and/or production costs.

The object is attained with the rope crossing according to the invention with claim 1. Advantageous embodiments of the rope crossing are recited in the dependent claims 2 to 4.

Rope play equipment, which advantageously includes at least one and several of the rope crossings according to the invention, is recited in the dependent claim 5.

A method for producing a rope crossing according to the invention is recited in independent claim 6, with advantageous embodiments of the method recited in the dependent claims 7 to 9.

An apparatus for carrying out the method of the invention and hence for producing the rope crossing according to the invention is recited in independent claim 10, with advantageous embodiments of this apparatus recited in the dependent claims 11 to 15.

According to the invention, a rope crossing for securing rope lines to each other is provided which includes at least two crossing rope lines and a ring, wherein the ring has an inner opening which includes twice the number of essentially radially extending receiving regions in relation to the number of the rope lines to be secured, wherein a corresponding line segment of a rope line forming an bulge is formed in two respective opposing receiving regions, so that the bulges of crossing rope lines are each arranged on opposite sides of the ring. According to the invention, the ratio of the unobstructed width LW of a receiving region to the diameter of the rope line D, which forms the bulge in this receiving region, is LW/D=0.8 to 0.98. This means that the unobstructed width LW of the receiving region is smaller by a certain percentage than the diameter of the rope line which forms the bulge in this receiving region. In this way, the static friction between the ring and particularly the receiving region, but also the rope line, is large enough so that the ring is firmly secured on the two rope lines that cross inside the ring.

The ring encompasses the bulge of the two rope lines. In this context, the term bulge indicates a simple open rope loop, i.e., a U-shaped path of the rope line. The contour of the inner opening of the ring corresponds approximately to that of a four-leaf clover. The receiving regions of the inner opening are hence used to receive the rope line segments. A respective rope line or its bulge is arranged in opposing receiving regions. The receiving regions have essentially the form of a catenoid, wherein the apex region is preferably described by a half circle to which linear, preferably mutually parallel wall sections are connected. However, the invention is not limited to this shape of the receiving region, and these receiving regions may instead also be concave regions, wherein one side of the rope line segments contacts these concave regions in at least in certain regions. The unobstructed width of the receiving region is the maximum distance between the two wall sections, which preferably extend linearly and parallel to each other and form a section of the respective receiving region. With mutually parallel wall sections and a connected semi-circular apex region, the unobstructed width of the receiving region is therefore the diameter of the semi circle of the apex region.

The ring preferably extends in a plane in which the inner opening is also disposed. The symmetry axis of the ring as well as the longitudinal axis of the inner opening, which preferably are in agreement with each other, therefore extends perpendicular to the plane of the ring. In the secured state, the bulges of the rope lines are located on opposing sides of the ring and advantageously at least partially outside the ring plane. In a preferred embodiment, the exterior shape matches the shape of the inner opening, so that the contour of the exterior shape corresponds to a scaled contour of the interior shape. In an alternative embodiment, the outside of the ring can also have a circular shape. The ring is preferably a punched part made of an aluminum alloy.

The rope crossing according to the invention has the advantage that a compression force exists between the ring and the rope line received in the ring due to the elasticity of the rope line and to a lesser degree of the ring, which generates friction such that the ropes are secured to each other at the crossing point as well as in the point of the contact between the rope lines. In a preferred application of ropes with a metal fraction, which are typically used for rope play equipment, the friction forces affecting securement are typically large enough to safely prevent shifting of the crossing point on one of the rope lines at least under normal load experienced when climbing on the rope play equipment.

The ring of the rope crossing according to the invention can be manufactured using only a small amount of material as conventional cloverleaf rings, because the unobstructed width of the receiving regions is smaller than with conventional rings, so that the outside diameter of the rings can also be kept smaller. In addition, no additional element needs to be disposed on one of over two rope lines to prevent the crossing point from shifting. It then becomes evident that with the invention less material is required and less time and effort needs to be expended during fabrication and installation of the rope crossing point according to the invention to safely and cost-effectively secure a rope crossing. The friction forces securing the rope lines to each other are generated from the compressive force between the ring and the respective rope line and from the compressive force between the rope lines themselves. The encompassing angle formed by the respective bulges is then no longer the deciding factor for securing the rope lines, so that rope lines which enclose a relatively small angle of the rope line segments at the rope crossing point can also be secured to each other with the invention. With the rope crossing according to the invention, a safe connection can be provided in rope networks even when individual rope lines cross at a relatively small angle.

Experiments have shown that the ratio of the unobstructed width LW of a receiving region to the diameter of the rope line D, which forms the bulge in this recess, should be $LW/D=0.9$ to 0.92. For example, the unobstructed width is $LW=17$ mm for a rope diameter $D=18$ mm.

Preferably, the rope lines cross essentially at the center of the ring and in the plane of the ring. In other words, the point of contact of the inner sides of the bulges of the rope lines is also located at the center of the interior opening of the ring as well as in the projection region of the wall of the ring perpendicular to the symmetry axis and/or the longitudinal axis of the inner opening.

According to another advantageous embodiment of the rope crossing according to the invention, the rope lines may have a metal fraction. Preferably, this metal fraction is implemented as a central strand with a metal fraction—in the form of a wire rope in the rope line. The metal strand can optionally be encompassed by nylon strands which may also have a metal fraction. The metal strand can form the core of the rope line or may be a strand which has a metal fraction and is wound around the core. Alternatively, a polypropylene strand can be used instead of a metal strand. If the rope line includes the aforementioned preferred metal strand, it can be made so strong that up to 25% of the cross-sectional area of the rope line is formed by the metal fraction.

The use of metal strands ensures that the individual rope lines have a relatively high elasticity module, so that corresponding constrictions in the rope lines produced by the small unobstructed width of the receiving regions creates correspondingly strong reactive normal forces which produce correspondingly large friction forces that depend on the employed material of the ring and of the rope lines.

According to the invention, rope play equipment is also provided which, in particular, may be a rope climbing apparatus or which at least includes a rope crossing according to the invention. The framework of the rope play equipment may have, for example, the shape of one of the Platonic shapes, in which, preferably scaled, ropes or rope lines emulating the shape of the framework are held or tensioned in a three-dimensional network suitable for climbing and/or holding ropes and the like, which in turn can also be climbed. The rope crossings according to the invention safely prevent unintentional displacement of a rope crossing point, thus reducing the risk during climbing and maintaining the shape and the structure of the three-dimensional rope network.

In addition, the invention also provides a method for producing a rope crossing according to the invention, wherein a first rope line is guided through the ring so as to form a first bulge arranged on a first side of the ring, and a second rope line is guided along the first side of the ring so as to be encompassed or being able to be encompassed by the first bulge, and wherein the ring and the first bulge move towards each other when the second rope line is encompassed by the first bulge, until a point of contact of the rope lines with each other is essentially in the plane of the ring.

When a first bulge is formed which is arranged on a first side of the ring, then the sections of the first rope line adjacent to the first bulge are arranged on the second side of the ring opposite the first side. The second rope line can then be encompassed by the first bulge, if the second rope line has already been guided along the first side of the ring and the first rope line has not yet formed a first bulge, but only forms the first bulge after the second rope line has been arranged on the first side of the ring. When the second rope line is encompassed by the first bulge, the two rope lines cross. The distance between the first bulge and the ring decreases when the ring and the first bulge approach each other. The point of contact of the rope lines with each other is here the rope crossing-related contact point of the rope lines. This point of contact of the rope lines with each other is preferable be exactly in the center of the thickness or plane of the ring, which corresponds to the projection region of the ring perpendicular to the longitudinal axis of the inner opening. When executing the method of the invention, the first rope line is arranged in two receiving regions. Due to the relative movement between the ring and the first bulge, the second rope line is pulled into the remaining receiving regions of the inner opening, which are oriented perpendicular to the receiving regions where the bulge of the first rope line is arranged, so that the rope lines preferably cross perpendicular to each other. As a result, the first rope line forms a first bulge arranged on the first side of the ring, whereas the second rope line forms a second bulge arranged on the second side of the ring opposite the first side. The sections of the rope lines forming the bulges protrude from the side of the ring opposite to respective bulge. In a preferred embodiment of the method, the second rope line is threaded through the first bulge so as to be encompassed by the first bulge, before the ring and the first bulge approach each other.

The approach of ring and first bulge is preferably attained with a pressing force on the first bulge. This means that the relative movement between the ring and the first bulge is realized by introducing a pressing force on the first bulge in the direction of the ring, thereby securing the ring in its position. This overcomes the friction forces between the ring and the rope lines. Due to the high stiffness of the rope line used in particular for rope play equipment, there is no risk that the first rope line buckles. This applies particularly to the preferably used rope lines with a relatively high metal fraction.

However, the present invention is not limited to applying a pressing force on the first bulge. Alternatively, a pulling force can be introduced in the two rope line segments forming the first bulge while simultaneously securing the ring, so that the first bulge is pulled into the ring, thereby forming a second bulge in the second rope line.

Preferably, the movement of the first bulge in the direction of the first ring is wide enough so that the point of contact between the rope lines is located essentially in the plane of the ring.

In another advantageous embodiment, at least one receiving region of the ring is compressed in the plane of the ring, thereby producing a plastic deformation and reducing the unobstructed width LW. This method step is preferably executed after producing a rope crossing in the plane of the ring, so that afterwards the friction forces between the rope lines and between a respective rope line and the ring are increased. Preferably, opposing receiving regions are compressed so as to clamp a rope line more firmly than by only pulling the rope line into the respective receiving regions.

For carrying out the method of the invention, an apparatus for producing a rope crossing according to the invention is provided which has a receiving device for non-positively and/or positively securing a ring in at least one translational degree of freedom, a first force-exerting device which can be brought mechanically into an operative connection with an bulge of a rope line and with which a first translational movement of the bulge can be generated such that the apex of the bulge moves away from the ring, wherein the rope line segments abutting the bulge extend through the ring, and a second force-exerting device which can be brought mechanically into an operative connection with an bulge of a rope line and with which a second translational movement of the bulge can be generated such that the apex of the bulge approaches the ring. The aforementioned second translational movement generated by the second force-exerting device is oriented opposite to the first translational movement. The two aforementioned translational movements occur preferably in the direction of the blocked translational degree of freedom of the ring.

In an advantageous embodiment, the first force-exerting device is a hook which is mechanically connected with a pulling device of the apparatus of the invention. By introducing a pulling force in the hook, the hook which has engaged in a bulge can be pulled away together with the bulge, so that the bulge or the rope line segments adjacent to the bulge are pulled through the ring and a bulge is formed on the first side of the ring, wherein the bulge is large enough so that a second rope line can be threaded through.

In an alternative embodiment, the first force-exerting device can also be a pressure device with which the first bulge is pressed through the ring.

The second force-exerting device is preferably a punch mechanically connected with a pressure device. Instead of the aforementioned pressure device, alternatively a pulling device can also be used which can be attached, for example, to the rope line segments of the bulge and which holds the bulge closer to the ring, so that a second rope lines threaded through the bulge is pulled into the ring by forming a second bulge.

For a cost-effective design of the apparatus of the invention, the pulling device and/or the pressure device is a spindle drive. This means that the pulling device and the pressure device are preferably formed by the same drive, for example a spindle drive. This spindle drive may as a first force-exerting device exert a pulling force onto a bulge and as a second force-exerting device a pressure force onto the same bulge. Possible alternative embodiment would be different types of drives or a hydraulic or pneumatic device capable of generating the corresponding pulling and/or pressure forces. Such pulling and/or pressure force can be readily realized by using the preferably employed spindle drive, which allows pulling or pressing the rope lines into the smaller-sized receiving regions of the inner opening in spite of their greater diameters. The spindle drive includes, in addition to a spindle, a support which can also be referred to as framework, frame or support and which is used for receiving the spindle and its bearing as well as for receiving the reaction forces when load is applied to the spindle. Advantageously, a receiving device for non-positively and/or positively securing the ring position is also arranged in this support. Moreover, the support can also be constructed to have a relatively narrow region for receiving the spindle and hence also for receiving a pulled-in or pushed-in bulge for preventing buckling of the bulge, when the bulge approaches the ring under a pressure force. The support can also include handles for manually holding the apparatus. The spindle drive may optionally include a motor as a drive or a coupling location for attaching a motor or a hand crank.

In particular with an embodiment where the first and the second force-exerting device is realized with the same spindle drive, the hook is arranged on the punch in such a way that it can be removed from a position suitable for pulling the rope. Advantageously, the hook is arranged on an axis extending in the punch for pivoting about the axis, so that the hook can be switched into a pulling position and thereby arranged between a side of the punch facing the bulge and the bulge, so that the hook can engage in the bulge and pull the bulge. Due to the arrangement of the hook on the axis, the hook can also be pivoted so that it is no longer arranged between the side of the punch facing the bulge and the bulge, so that the punch can apply a pressure force on the bulge in the direction of the ring, without the hook itself getting in the way.

Preferably, the apparatus of the invention for producing a rope crossing has at least one drive motor for driving the first and/or the second force-exerting device. In one embodiment of the apparatus, where the first force-exerting device is not implemented with the same unit as the second force-exerting device, separate drive motors may be arranged for the first and the second force-exerting devices. Preferably, however, the first and the second force-exerting device are realized with the spindle drive which can be driven with a single drive motor, wherein the rotation direction of this motor can preferably be switched in order to realize the pulling motion and the pressure motion. In the embodiment with a motor, the apparatus of the invention is therefore a complete, specially constructed linear module.

In an alternative embodiment, the spindle device may include a crank or be configured for connection to a crank, so that the rope crossing according to the invention can also be produced solely manually.

The apparatus of the invention is therefore a device which can be manually moved to the location where the rope crossing is to be produced, where it can be held and operated by an operator. Accordingly, the apparatus of the invention is suitable for producing rope play equipment with rope crossings as well as advantageously for repairing rope play equipment on site.

The present invention will be described hereinafter with reference to the exemplary embodiment illustrated in the appended drawings. It is shown in FIG. 1 a rope crossing according to the invention in a perspective view, FIG. 2 a ring in a top view, FIG. 3 a rope crossing according to the invention in a cross-sectional view, FIG. 4 a modified embodiment of a ring, FIGS. 5 to 13 an apparatus according to the invention for producing the rope crossing according to the invention in a perspective view with individual elements of the apparatus being in different positions, and FIG. 14 a rope crossing according to the invention produces the apparatus.

Figure 1:
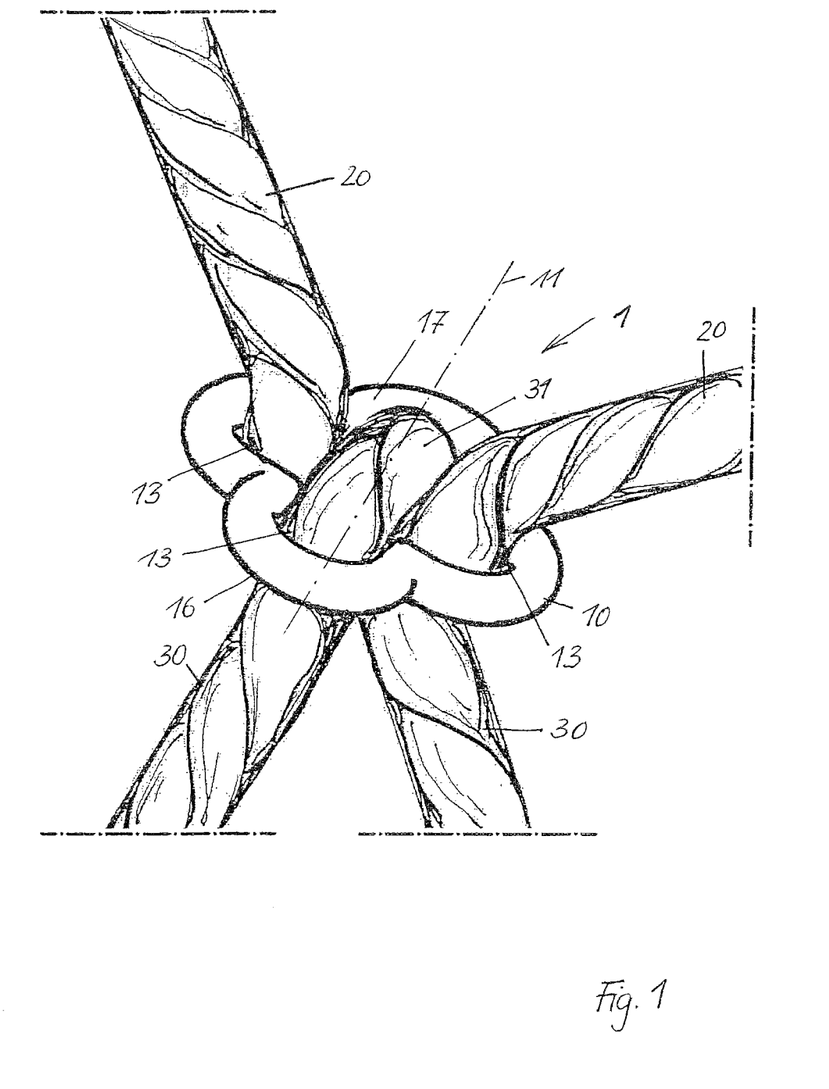

FIG. 1 illustrates a rope crossing 1 according to the invention, showing the rope crossing 1 with a ring having an inner and outer contour resembling a four-leaf clover. A first rope line 20 and a second rope line 30 extend through the ring 10. The two rope lines 20, 30 cross in the center of the ring 10. The first rope line 20 thereby forms a first bulge 21 (not visible in FIG. 1), and the second rope line 30 forms a second bulge 31. The second bulge 31 is here arranged on the second side of the ring 17. The first bulge 21 is arranged on the side of the ring facing the second side 17. The path of the rope lines 20, 30 through the receiving regions 13 in the inner opening 12 of the ring 10 ensures that the rope lines 20, cross.

Figure 2:
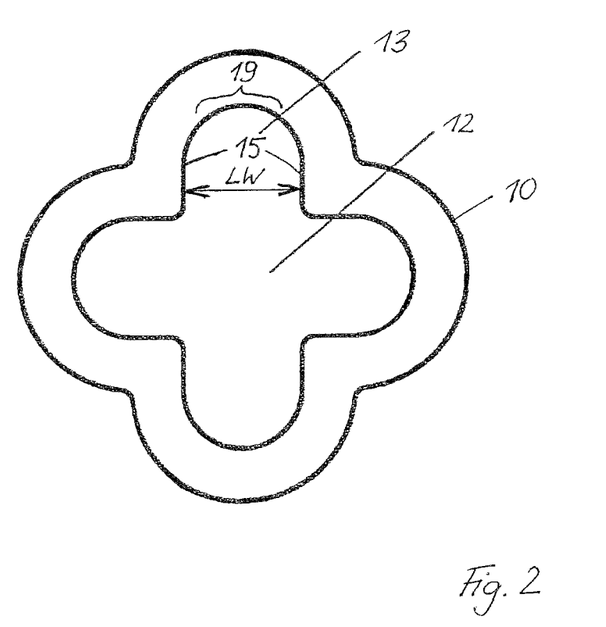

FIG. 2 shows the shape of the ring 10, which has a centrally located inner opening 12 essentially in the shape of a cross. The inner opening 12 includes receiving regions 13 which extend radially from the center of the ring 10. The receiving regions 13 have an unobstructed width LW defined by the mutual distance between straight wall sections 15. The straight wall sections 15 are connected with each other via a concave apex region 19. Opposing receiving regions 13 are configured to receive a corresponding rope line 20 or 30.

Figure 3:
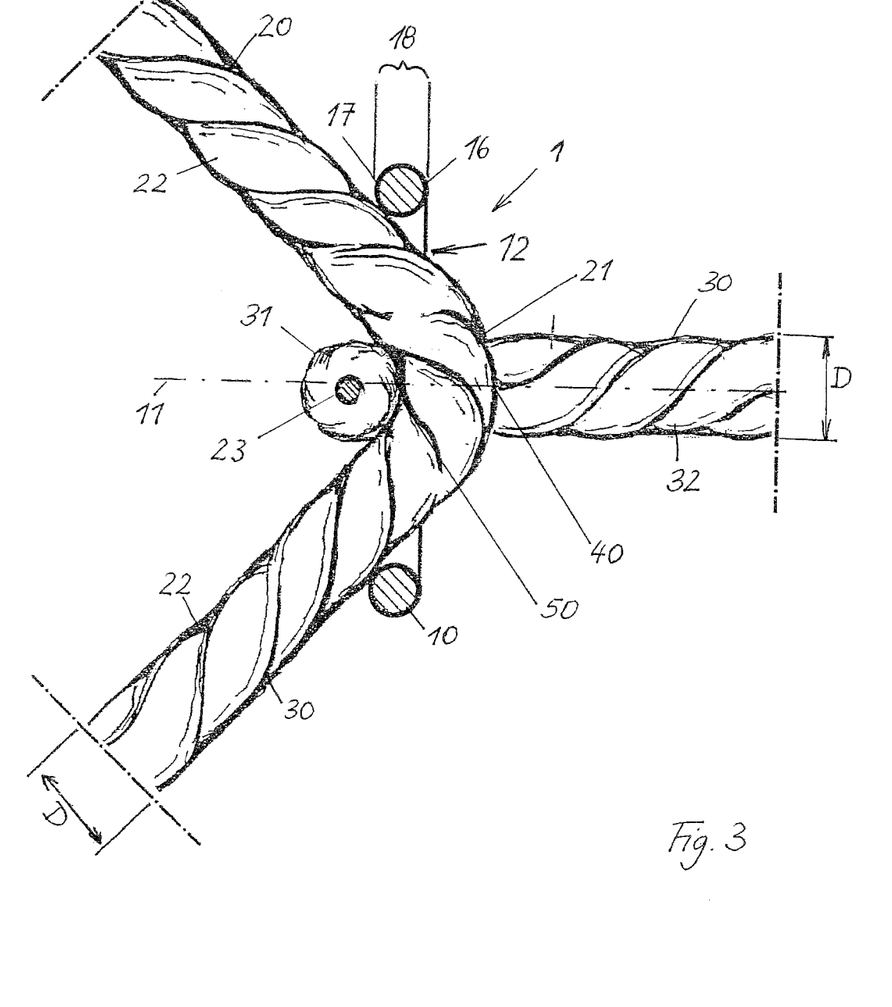

In particular FIG. 3 illustrates that, due to the crossing of the rope lines 20, 30, the respective bulges 21 and 31 are located on opposing sides of the ring, namely on the first side of ring 16 and on the second side of ring 17. A crossing point of the rope lines 20, 30 or a point 50 of contact between the rope lines 20, with each other, is in the rope crossing according to the invention preferably located in the center of the plane 18 of the ring 10, so that the two bulges 21 and 31 of the rope lines 20 and 30 protrude an equal distance from the ring 10. The crossing point 50 or the point of contact between the rope lines is preferably located on a symmetry axis 11 of the inner opening 12 of the ring 10.

The employed rope lines 20, 30 preferably include at least one metal strand 23, either located in the core as illustrated, or alternatively encompassing the core.

According to the invention, the diameter D of the respective rope line 20 or 30, as seen in FIG. 3, is somewhat greater than the unobstructed width LW of a receiving region 13 configured to receive this rope line, as shown more clearly in FIG. 2. This produces very strong static friction between the respective rope line 20, 30 and the ring 10 and between the rope lines 20, 30, thereby securely securing the ring 10 on the rope lines 20, 30 at the desired position.

As also seen in FIG. 3, the rope line segments 22 adjacent to the first bulge extend to the second side 17 of the ring 10 located opposite the first bulge 21, and the rope line segments 32 adjacent to the second bulge 31 extent to the first side 16 of the ring 10. This means that the apex 40 of the first rope line 20 is located on the first side 16 of the ring 10. The apex of the second rope line 30 is located on the second side 17 of the ring 10.

Figure 4:
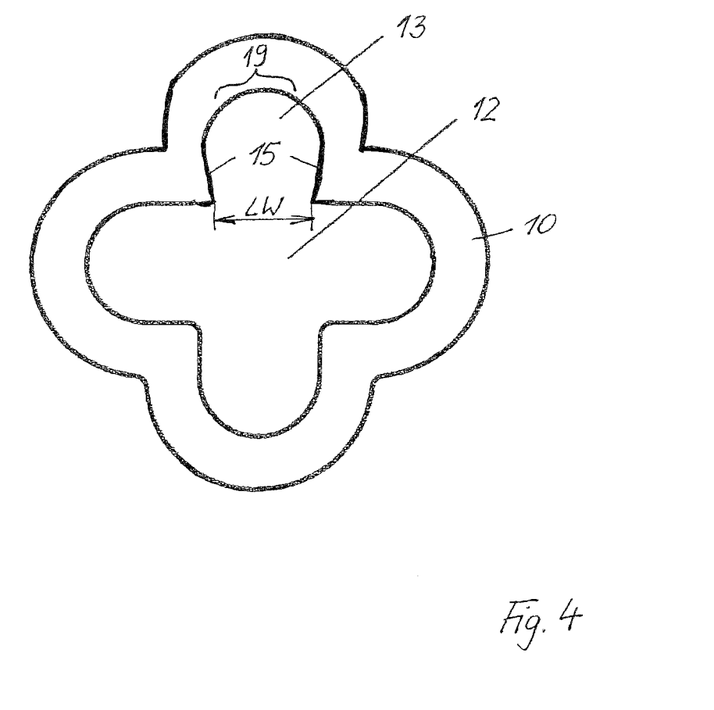
Figure 5:
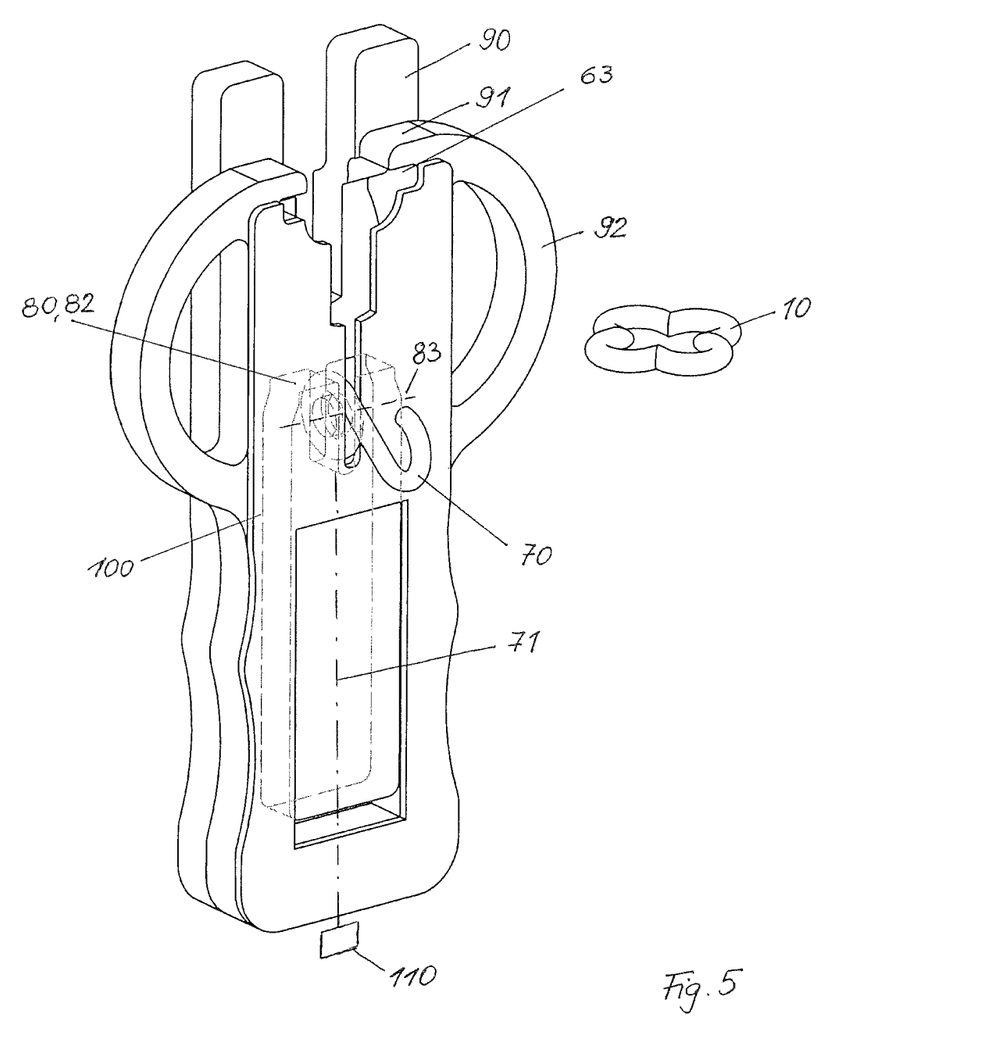

In a modification of the employed ring 10, the ring is crimped or deformed in at least one receiving region 13, preferably when its receiving regions 13 already encompass the rope lines 20 and 30, such that the unobstructed width LW is smaller than the diameter of the apex region 19, thereby increasing the normal forces between the rope lines 20, 30 and the ring 10, resulting in even larger friction forces. The ring 10 may not only be deformed in one receiving region 13, as shown in FIG. 4, but may also be similarly constricted in the opposing receiving region.

For carrying out the method of the invention, an apparatus is provided, as illustrated in FIGS. 5 to 13. The apparatus includes a support 90 constructed as a holder or framework. Contact faces 91 are disposed on end faces of the support 90. A receiving device 63 for receiving a ring 10 is arranged next to the support 90. A carriage 100, which can be moved with a spindle drive 71, which is indicated in FIGS. 5 to 13 only by a dot-dash line, is provided in or on the support 90. A motor or a hand crank is connected to the spindle drive 71 at a connecting point 110. A first force-exerting device in form of a hook 70 which can pivot about an axis 83 is arranged on the carriage 100 (indicated with a dot-dash line). The carriage 100 also includes a second force-exerting device in form of a punch 80 having a pressure face 82 associated with the receiving device 63. In addition, handles 92 are arranged on the support for manual operation of the apparatus.

Figure 6:
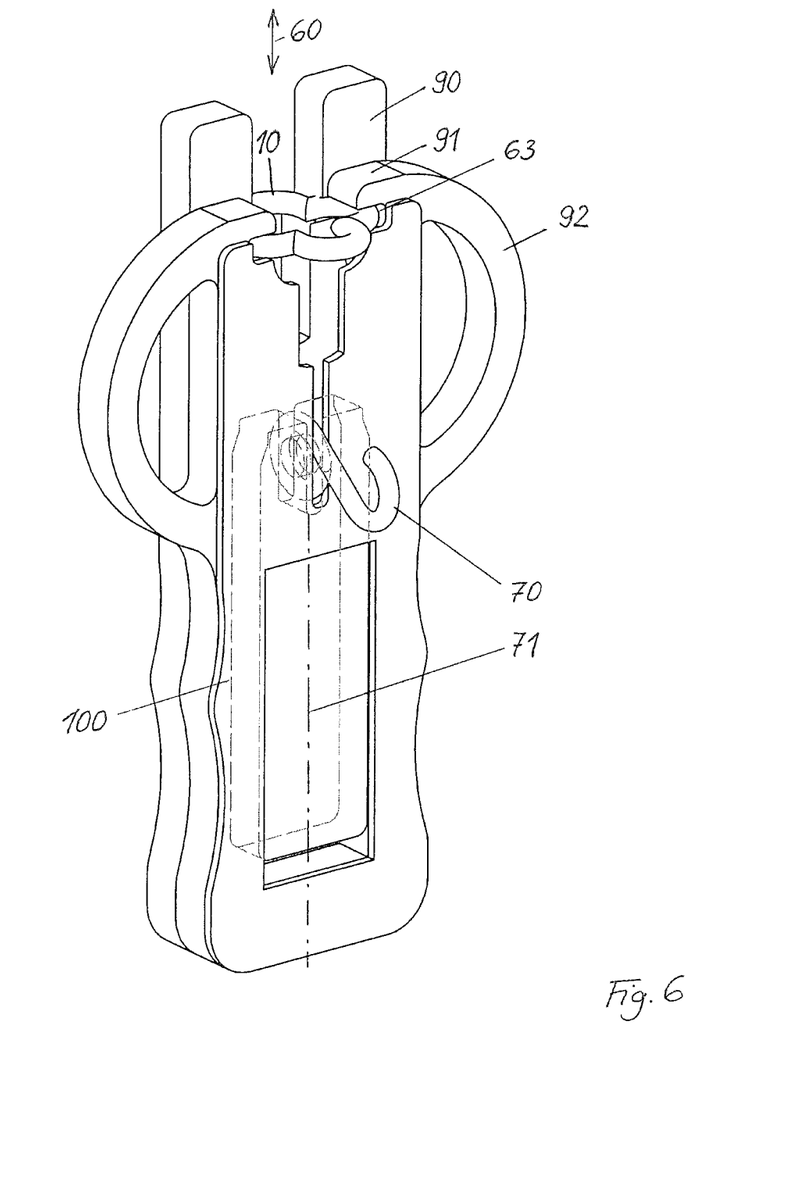

The method for producing the rope crossing according to the invention with the apparatus according to the invention will now be described with reference to FIGS. 5 to 13. Initially, the carriage 100 is in a position where the receiving device 63 is free. The ring 10 illustrated in FIG. 5 can be inserted into the receiving device 63, as shown in FIG. 6. When the ring 10 is received in the receiving device 63, the translational degree of freedom 60 of the ring 10 is blocked.

Figure 7:
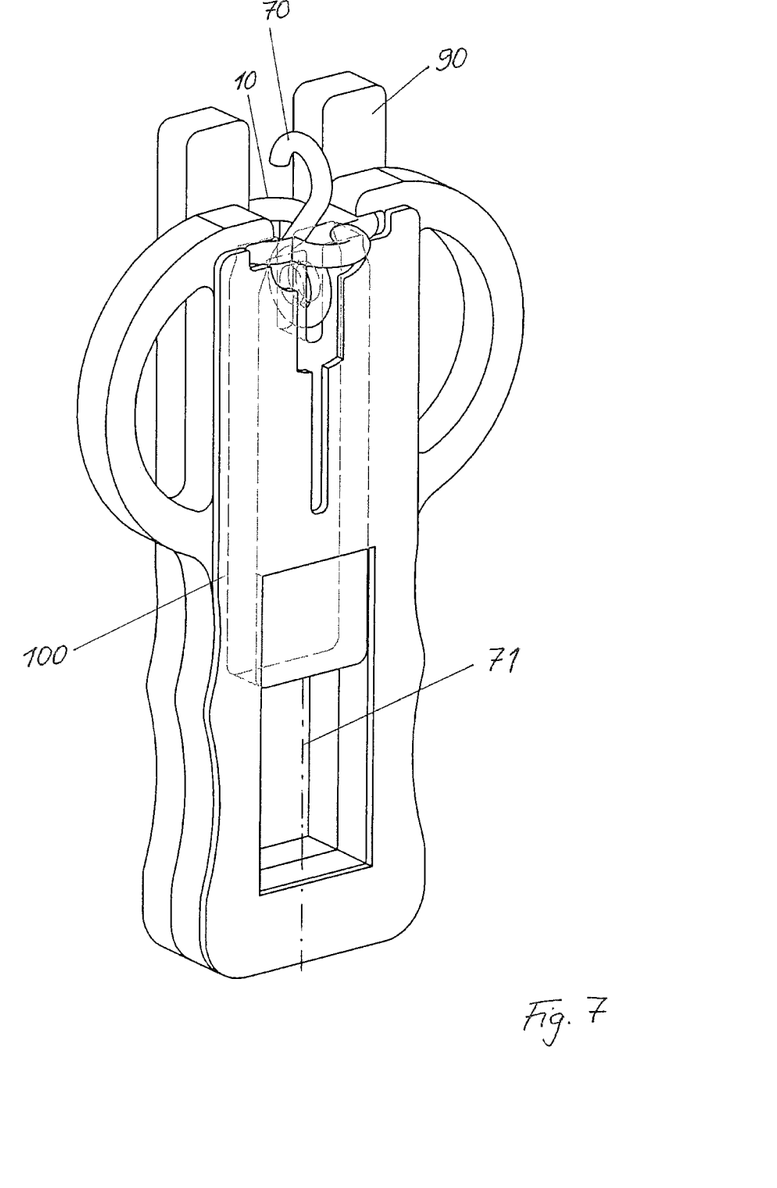
Figure 8:
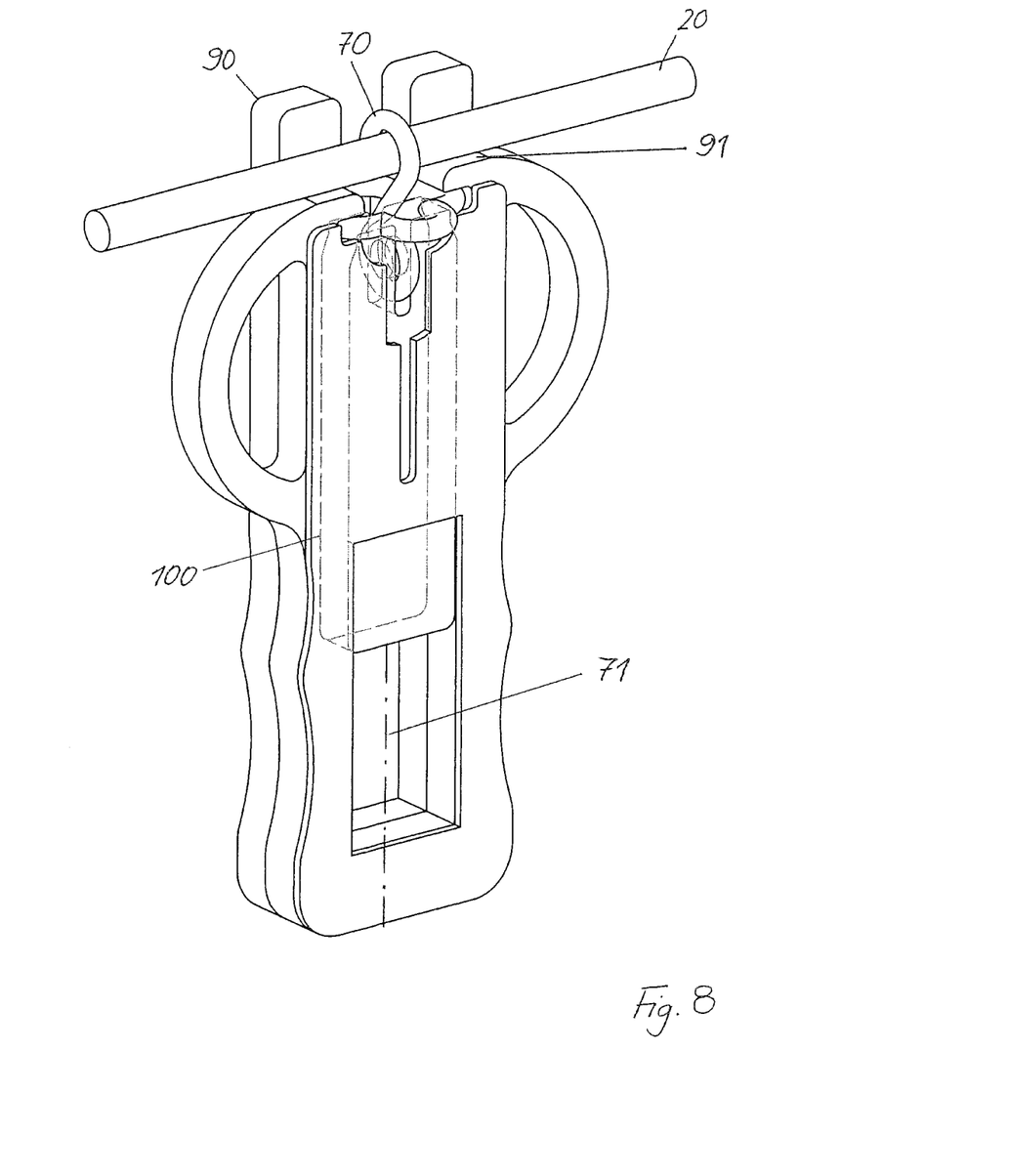
Figure 9:
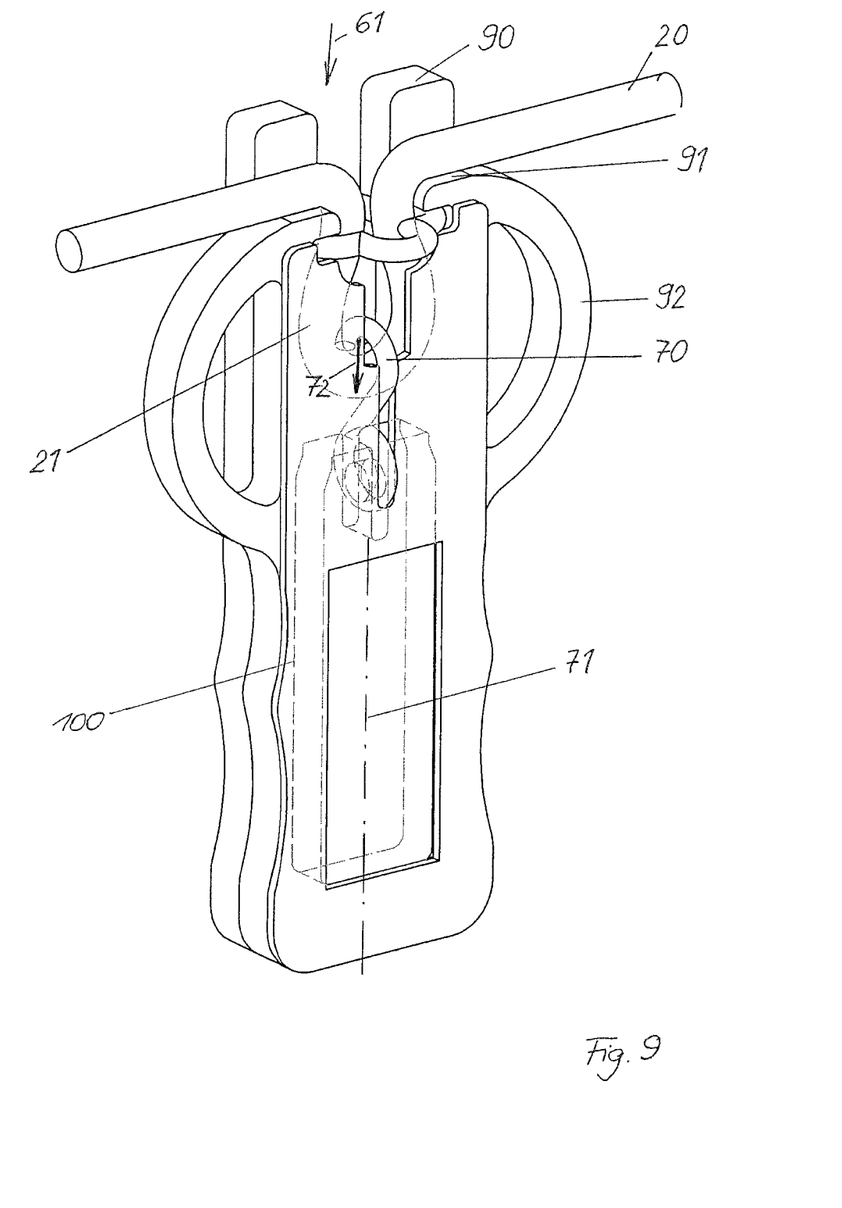
Figure 10:
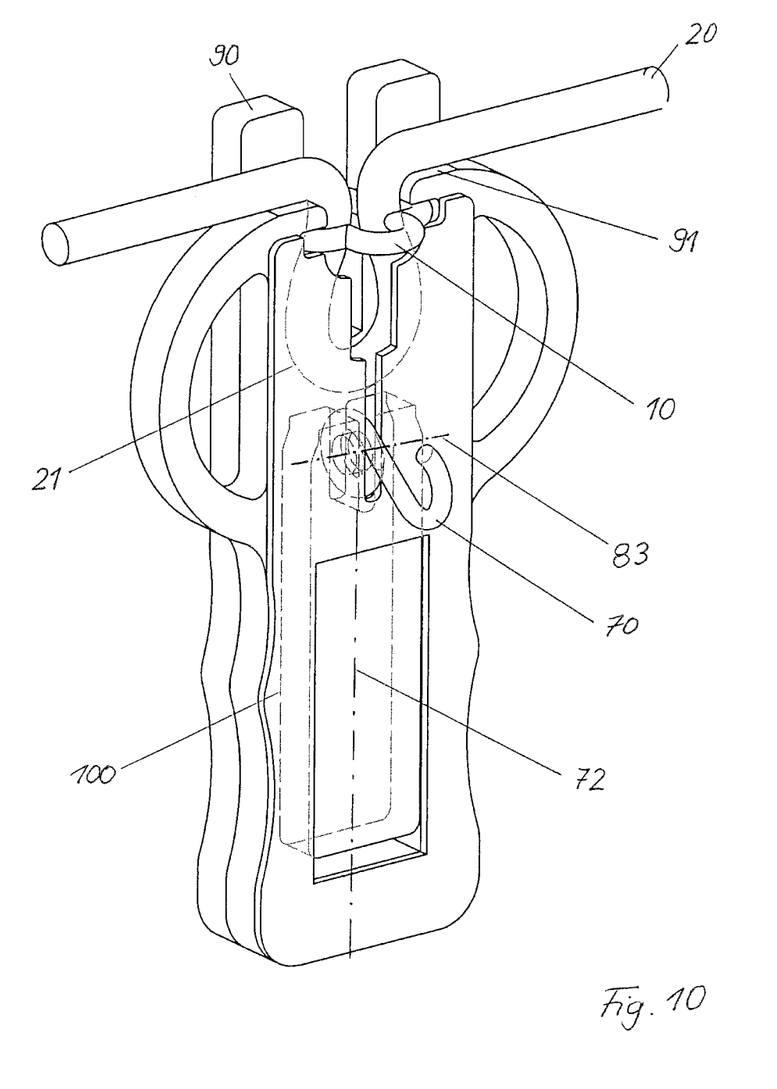
Figure 11:
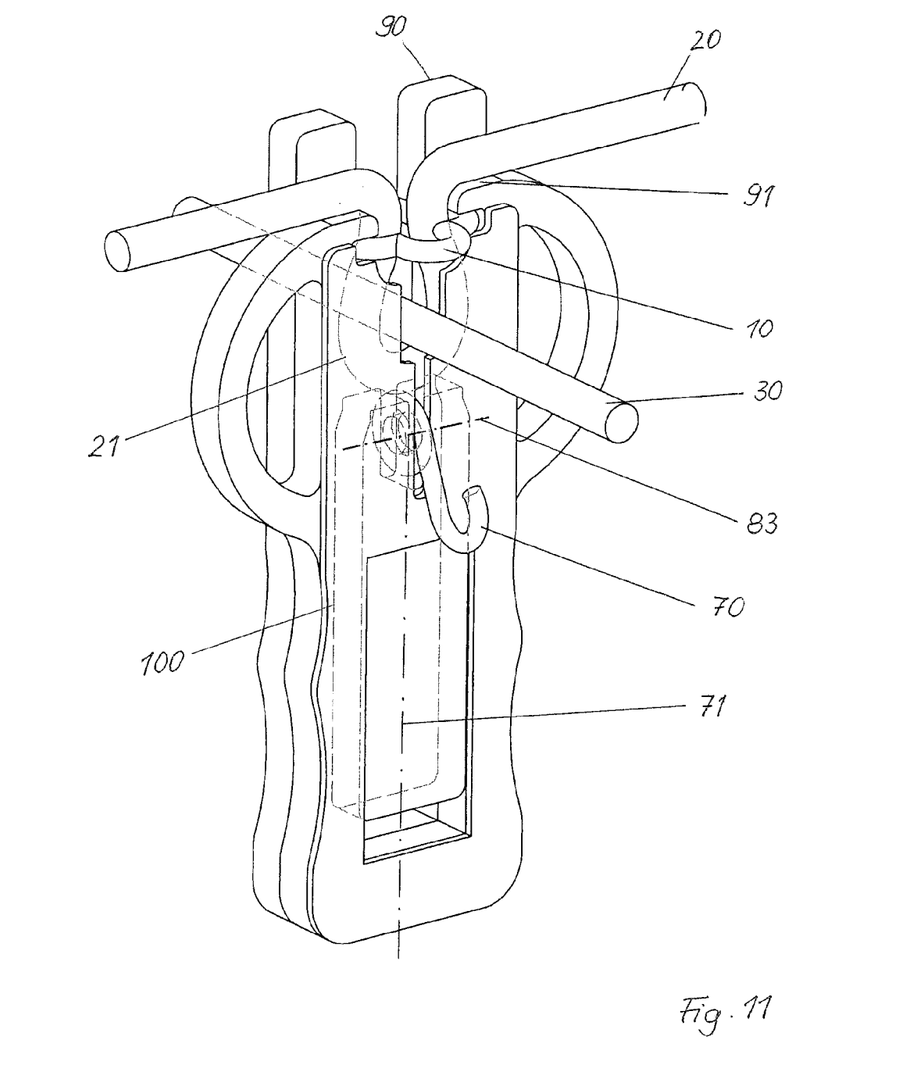
Figure 12:
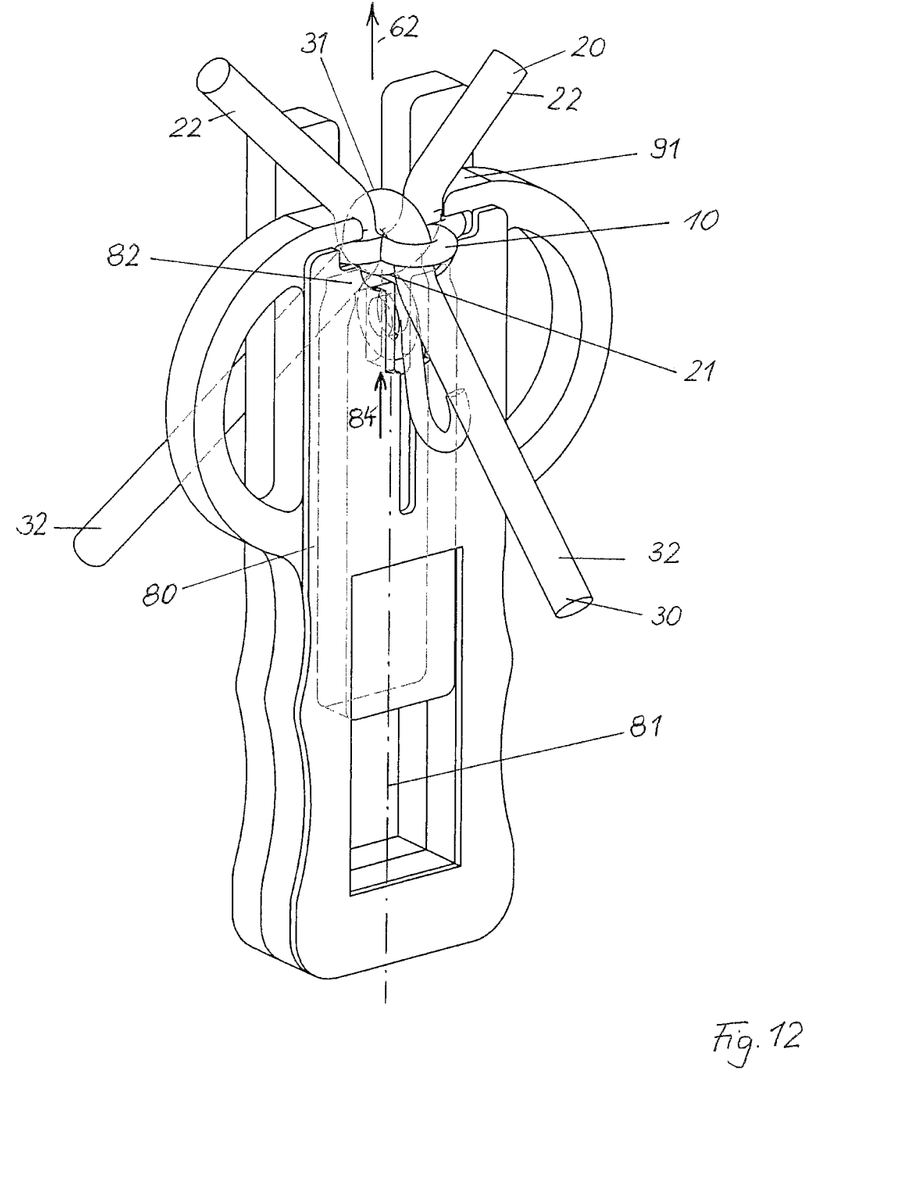
Figure 13:
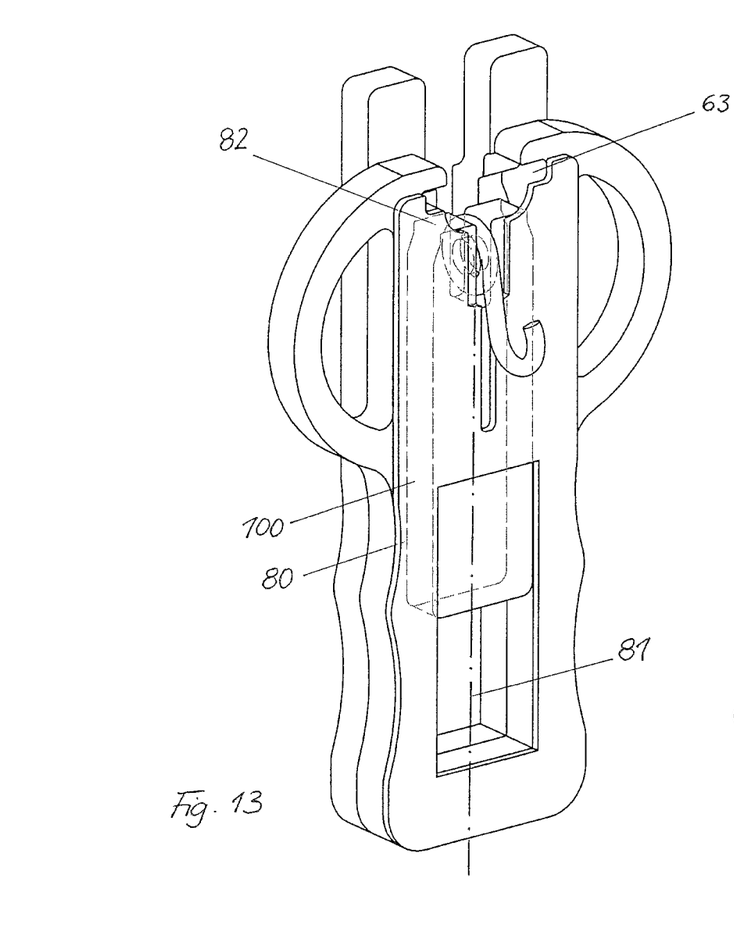
Figure 14:
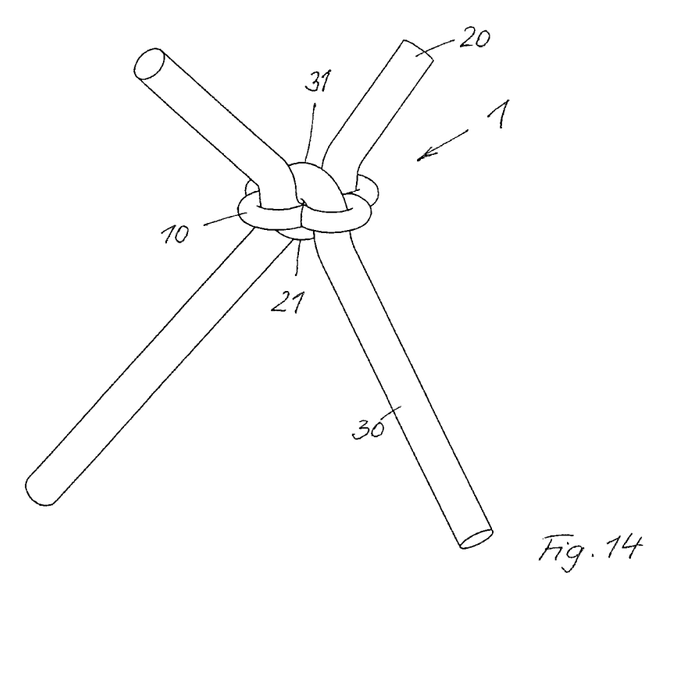

The carriage 100 is then moved to a position where the hook 70 when flipped downward extends through the ring 10, as illustrated in FIG. 7. In this position, the first rope line 20 can be pushed through the hook 70 or of the first rope line 20 can be grasped by the hook 70, as illustrated in FIG. 8. As shown in FIG. 9, the carriage 100 is then moved away from the ring 10 by operating the pulling device implemented in form of the spindle drive 71, so that a pulling force 72 exerted by the hook 70 pulls the first rope line 20 through the ring 10 so as to form a first bulge 21. This means that the first bulge 21 executes a first translational movement 61. Thereafter, as shown in FIG. 10, the hook 70 is pivoted out about the axis 83 and does no longer engage in the first bulge 21. The first bulge 21 is then free, so that a second rope line 30 can be pushed through the first bulge 21 and also through a corresponding recess in the support 90, as illustrated in FIG. 11. The carriage 100, which now operates as the second force-exerting device or as punch 80, it is then moved by the spindle drive 81 towards the ring 10, so that its pressure face 82 abuts the first bulge 21 and pushes the bulge 21 towards the ring 10, as illustrated in FIG. 12. In other words, the first bulge 21 performs a second translational movement 62 in response to the applied pressure force 84. The two rope lines 20 and 30 then cross inside the ring 10, as illustrated in FIG. 12.

The carriage 100 can then again moves slightly away from the ring 10, so that the produced rope crossing 1 can be removed from the apparatus.

List of References Symbols

Rope crossing 1
Ring 10
Symmetry axis 11
Inner opening 12
Receiving region 13
Unobstructed width LW
Straight wall section 15
First side of the ring 16
Second side of the ring 17
Plane of the ring 18
Apex region 19
First rope line 20
First bulge 21
Rope line segment connected to the first bulge 22
Metal strand 23
Second rope line 30
Second bulge 31
Rope line segment connected to the second bulge 32
Rope line diameter D
Apex 40
Crossing point, point of contact of the rope lines 50
Translational degree of freedom 60
First translational movement of the bulge 61
Second translational movement of the bulge 62
Receiving device 63
First force-exerting device, hook 70
Pulling device, spindle drive 71
Pulling force 72
Second force-exerting device, punch 80
Pressure device, spindle drive 81
Pressure face 82
Axis 83
Pressure force 84
Support 90
Contact surface 91
Handle 92
Carriage 100
Attachment point 110

The invention claimed is:

1. An apparatus for producing a rope crossing of rope play equipment for securing rope lines to each other, the rope crossing of the rope play equipment comprises at least two crossing rope lines (20, 30) and a ring (10), wherein the ring (10) has an inner opening (12), which comprises twice the number of essentially radially extending receiving regions (13) in relation to a number of the rope lines to be secured, and wherein a corresponding line segment of at least one of the rope lines (20, 30) forming a bulge (21, 31) is received in two corresponding receiving regions (13) facing each other, so that bulges (21, 31) of the crossing rope lines are arranged on respective opposite sides of the ring (10), the apparatus comprises:
- a receiving device (63) for non-positively or positively securing the ring (10) in at least one translational degree of freedom (60),
- a first force-exerting device (70) which can be brought mechanically into operative connection with the bulge of the rope line and with which a first translational movement of the bulge (61) can be generated such that an apex (40) of the bulge moves away from the ring (10), wherein rope line segments (22, 32) abutting the bulge extend through the ring, and
- a second force-exerting device (80) which can be brought mechanically into operative connection with the bulge of the rope line and with which a second translational movement of the bulge (61) can be generated such that the apex (40) of the bulge approaches the ring (10).

2. The apparatus according to claim 1, wherein the first force-exerting device is a hook (70) mechanically connected with a pulling device (71).

3. The apparatus according to claim 2, wherein the second force-exerting device is a punch (80) mechanically connected with a pressure device (81).

4. The apparatus for producing the rope crossing according to claim 3, wherein the hook (70) is arranged on the punch (80) and is removable from a position suitable for pulling the rope line.

5. The apparatus according to claim 3, wherein the pressure device (81) is a spindle drive.

6. The apparatus according to claim 2, wherein the pulling device (71) is a spindle drive.

7. The apparatus according to claim 1, further comprising:
- at least one drive motor for driving the first or the second force-exerting device.

* * * * *